United States Patent Office 3,171,081
Patented Feb. 23, 1965

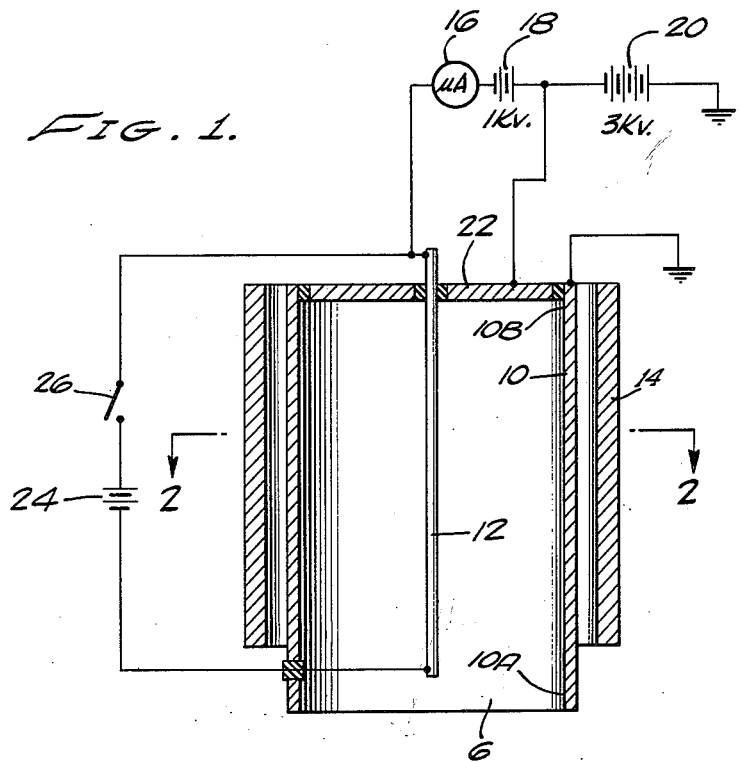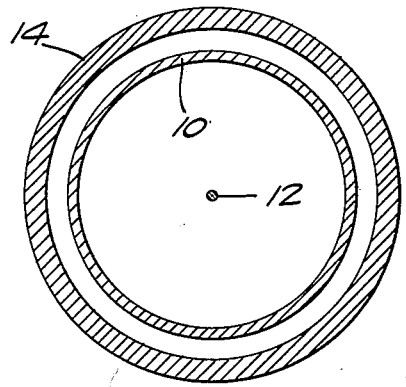
Fig. 1.
Fig. 2.
DONALD C. GARWOOD
INVENTOR.

3,171,081
IONIZATION VACUUM GAUGE
Donald C. Garwood, Altadena, Calif., assignor, by mesne assignments, to the United States of America as represented by the Administrator of the National Aeronautics and Space Administration
Filed Feb. 19, 1962, Ser. No. 173,981
3 Claims. (Cl. 324—33)

This invention relates to ionization vacuum gauges and, more particularly, to improvements therein.

A presently favored type of ionization vacuum gauge is one which consists of two short concentric cylinders, the outer cylinder being connected to a high potential source and the inner cylinder being connected to a microammeter and then to ground. These cylinders are usually enclosed in a glass envelope which is evacuated. Any electrons which arise, for example, from cosmic-ray ionization, gas-field emission, photo emission, or other causes are attracted to the outer cylinder. A magnetic field is provided which has a direction along the axes of the cylinders. This magnetic field causes the emitted electrons to orbit around the inner cylinder, instead of flowing to the outer cylinder. These electrons collide with residual gas, which results in the creation of positive ions. The positive ions flow to the inner cylinder, rather than orbit around it (because of their larger weight). The flow of ions to the inner cylinder is detected as a curent flowing to ground on a microammeter, and this indicates the degree of vacuum.

Because many electrons are present between the cylinders which have a component of velocity along the axial direction of the cylinders, they will travel out to the ends of the cylinders. To prevent this, many gauges have end plates connected to the inner cylinder. These end plates are at ground potential and serve to reflect electrons back toward the space between the cylinders.

When an electron happens to collide with the outer cylinder, soft X-rays are produced, which may hit the end plates. Electrons ejected from the end plates will go into orbit around the inner cylinder, and the lost electrons will appear as a curent flowing through the microammeter to ground and thus give a false reading of the degree of vacuum. A gauge of the type described is mechanically weak and difficult to install. The presence of end plates requires that the outer cylinder have holes open to the vacuum to be measured. The high voltage of the outer cylinder results in a need for insulation. Furthermore, a typical gauge, of the type described, requires some time to begin functioning where a very high vacuum exists, since there is little gas to ionize the high vacuum to produce ionizing electrons.

An object of the present invention is to provide an improved ionization vacuum gauge which does not provide false readings of the degree of vacuum.

Another object of the present invention is to provide a vacuum ionization gauge in which the problem of high voltage insulation is considerably simplified.

Yet another object of the present invention is the provision of an ionization vacuum gauge that can be readily started even in a very high vacuum.

Yet another object of the present invention is to provide a structurally sound ionization vacuum gauge.

Still another object of the present invention is the provision of an ionization vacuum gauge that can be readily mounted to have access to a vacuum desired to be measured.

These and other objects of the invention may be achieved in an arrangement wherein an outer cylinder surrounds a centrally disposed electrode or inner cylinder. The outer cylinder has its length at least equal to its inner diameter or longer. The central cylinder extends substantially the length of the outer cylinder. One of the end plates usually found in an ionization vacuum gauge may be omitted. The omission of one end plate affords easier access of the cylinders to the vacuum to be measured than when two end plates are employed. The electrical connections of the cylinders and end plates are such that any curent flowing from the end plate as a result of a loss of electrons will not be indicated on the microammeter which is employed with the gauge. Furthermore, the inner cylinder is connected to ground through a microammeter instead of to a negative voltage, while the outer cylinder is connected to a positive voltage source. If the end plate is then connected to a point at a potential between the potentials of the inner and outer cylinders, and yet not in the current path of the meter, then spurious currents resulting from electrons leaving the end plates are not measured by the meter, and, furthermore, the inner cylinder will receive substantially all of the ion current. In addition, an external switch and potential source is provided for heating the inner cylinder, whereby it will emit electrons and start the gauge working very quickly.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a partial sectional side-elevation view of the ionization vacuum gauge which is an embodiment of this invention; and FIGURE 2 is a bottom elevation view of the ionization vacuum gauge shown in FIGURE 1.

In accordance with this invention, an ionization vacuum gage is provided which, considering FIGURES 1 and 2, has a long outer cylinder 10 which surrounds a central electrode 12. The central electrode 12 is cylindrical in form and preferably constitutes a thin high-resistance wire. A magnet 14 provides a magnetic field within the outer cylinder 10 which is oriented along the axis of the cylinder. The central electrode 12, or inner cylinder, has one end connected to a microammeter 16. The other side of the microammeter 16 is connected to a high potential source, respectively 18, 20, which is negative with respect to ground. The outer cylinder 10 is electrically connected to ground. The open end 10A of the outer cylinder is connected to the vacuum to be measured. An end plate 22 closes the other end 10B of the cylinder and serves to prevent loss of vacuum through the cylinder. Thus, no auxiliary envelope is required, connection of this vacuum gauge to a vacuum to be measured being made simply by exposing the open end 10A of the outer cylinder thereto, and by sealing the outer cylinder to whatever walls contain the vacuum.

By connecting the inner cylinder to the high negative potential, instead of the connection being made between the outer cylinder and a source of high positive potential, the problem of insulation is considerably simplified, since all that need be insulated with this embodiment of the invention is the thin inner cylinder or filament wire, whereas heretofore it was necessary to insulatingly support the large outer cylinder 10, which presents a much more difficult insulation problem.

It has been indicated that the cylinder 10 and the inner cylinder 12 are long. As was pointed out previously, the commonly employed ionization vacuum gauges will have an outer cylinder having a diameter of about three times its length. It has been found that if the length of the outer cylinder chamber is increased to either equal its inner diameter or be larger than its inner diameter, electrons with any axial component of velocity will remain within the chamber long enough to obtain sufficient ion current for convenient operation of the gauge with only one end plate, or with none at all. The elimination of one end plate allows one end of the outer cylinder to be opened to the vacuum to be measured. Accordingly, in accordance with this invention, the length of the outer cylinder is at least equal to its inner diameter. The concentric inner cylinder, of course, will substantially extend along with the outer cylinder.

One end plate 22 need be employed with this embodiment of the invention. It is insulatingly supported from the outer cylinder 10 and helps to insulatingly support the inner cylinder 12. The end plate 22 is connected between the potential sources 18 and 20 to bypass the microammeter, so that any current flowing from the end plate as a result of loss of electrons emitted therefrom will not register on the microammeter. If it were desirable to reverse the polarity of the connection so that the outer cylinder was connected to a high positive voltage source and the inner cylinder connected to ground through a microammeter instead of to a negative voltage, then spurious currents could be eliminated by connecting the end plate directly to ground, bypassing the microammeter. The arrangement shown in FIGURE 1, however, is preferable. The potential point to which the end plate is connected is preferably between the potentials of the inner cylinder and the outer cylinder. In an embodiment of this invention which was constructed, the end plates were connected to a point of the potential source which was one kilovolt above the potential of the inner cylinder and over 90% of the ion current flowed to the inner cylinder.

In order to enable extremely rapid starting with this invention, the inner cylinder 12 is preferably made of a high-resistance wire. This is connected to a source of potential 24 through a switch 26. Accordingly, if a very high vacuum is to be measured, the switch 26 is closed and the high-resistance wire heats up and emits some electrons to start the gauge working quickly. As soon as the gauge begins to operate, the switch 26 is opened. The gauge will then continue operating in view of the electrons which have already been produced.

Accordingly, there has been described and shown herein a novel, useful, and improved vacuum ionization gauge which is simpler and stronger, and which operates with substantially no spurious current.

I claim:

1. An ionization vacuum gauge comprising a hollow, conductive cylinder having a length at least equal to its inner diameter, a conductive end plate for closing one end of said cylinder, means for supporting said end plate insulatingly from said cylinder, a central electrode, means for insulatingly supporting said central electrode along the axis of said cylinder from said end plate, current-indicating means, one end of said current-indicating means being connected to said central electrode, a source of operating potential, one end of said source of operating potential being connected to the other end of said current-indicating means, the other end of said source of operating potential being connected to said cylinder, and means for applying potential from said source of operating potential to said end plate having a value intermediate the value of potential existing between said electrode and said cylinder.

2. An improved ionization vacuum gauge comprising a conductive hollow cylinder, a conductive end plate for said hollow cylinder, means supporting said conductive end plate insulatingly from said hollow cylinder, a central electrode means for insulatingly supporting said central electrode coaxially within said hollow cylinder, a first source of potential, a switch, means connecting said switch and first source of potential in series, means connecting said serially connected switch and first source of potential across opposite ends of said central electrode for the purpose of heating said central electrode to emit electrons for initiating operation of said vacuum gauge, a second and third source of potential, means connecting one end of said second source of potential to one end of said third source of potential, means connecting said end plate to the junction of said second and third sources of potential, means connecting the other end of said third source of potential to said cylinder, a current-measuring device, and means connecting said current-measuring device between said central electrode and the other end of said second source of potential.

3. In an ionization vacuum gauge of the type having a cylindrical chamber within which a central electrode is positioned, one end of said cylindrical chamber being closed off by an insulatingly supported conductive end plate, said central electrode being connected to one side of a current measuring device and a potential source being connected between the other side of said current measuring device and the wall of said cylindrical chamber, the improvement comprising means connecting said end plate to said potential source for establishing said end plate at a potential between that of said chamber and said current measuring device, whereby spurious currents flowing from said end plate do not pass through said current measuring device.

References Cited by the Examiner

UNITED STATES PATENTS 2,817,030  12/57  Beck _____ 313—161 X
2,884,550  4/59  Lafferty _____ 313—7

GEORGE N. WESTBY, *Primary Examiner.*

ARTHUR GAUSS, DAVID J. GALVIN, *Examiners.*